United States Patent [19]

Munk et al.

[11] Patent Number: 4,504,347

[45] Date of Patent: Mar. 12, 1985

[54] METHOD OF HOT PRESSING A SYNTHETIC-RESIN LAMINATE

[75] Inventors: Edmund Munk; Herbert Haas, both of Oberstenfeld, Fed. Rep. of Germany

[73] Assignee: Werzalit Pressholzwerk J. F. Werz Jr. KG, Oberstenfeld, Fed. Rep. of Germany

[21] Appl. No.: 257,412

[22] Filed: Apr. 24, 1981

Related U.S. Application Data

[63] Continuation of Ser. No. 160,144, Jun. 6, 1980, abandoned, which is a continuation of Ser. No. 7,405, Jan. 29, 1979, abandoned, which is a continuation of Ser. No. 865,740, Dec. 29, 1977, abandoned, which is a continuation of Ser. No. 736,089, Oct. 27, 1976, abandoned.

[30] Foreign Application Priority Data

Oct. 31, 1975 [DE] Fed. Rep. of Germany ....... 2548739

[51] Int. Cl.[3] ........ B32B 31/20

[52] U.S. Cl. ........ 156/245; 156/62.2; 156/62.6; 156/62.8; 156/87; 156/312; 264/120; 264/123

[58] Field of Search ........ 156/62.2, 62.6, 62.8, 156/87, 228, 245, 276, 288, 311, 312, 320, 242; 264/109, 120, 123, 124, 128, 257

[56] References Cited

U.S. PATENT DOCUMENTS

| | | | |
|---|---|---|---|
| 2,757,114 | 10/1956 | Roberts | 264/124 |
| 3,423,264 | 1/1969 | Munk | 264/120 |

FOREIGN PATENT DOCUMENTS

| | | | |
|---|---|---|---|
| 1083438 | 9/1967 | United Kingdom | 264/123 |
| 1267903 | 3/1972 | United Kingdom | 156/62.8 |

*Primary Examiner*—Caleb Weston
*Attorney, Agent, or Firm*—Michael J. Striker

[57] ABSTRACT

A nonswelling mass of fibers and a thermosetting synthetic resin are cold pressed into a preform body having a predetermined primary volume. This preform body is then hot pressed into an intermediate body having a secondary volume smaller than the primary volume. The press is then opened and a thermosetting synthetic-resin skin is applied to at least a portion of the surface of the intermediate body. Thereafter the skin and body are together pressed into a final integrated body having a volume smaller than the secondary volume. The skin is applied to the intermediate body as a foil.

4 Claims, 4 Drawing Figures

FIG. 1
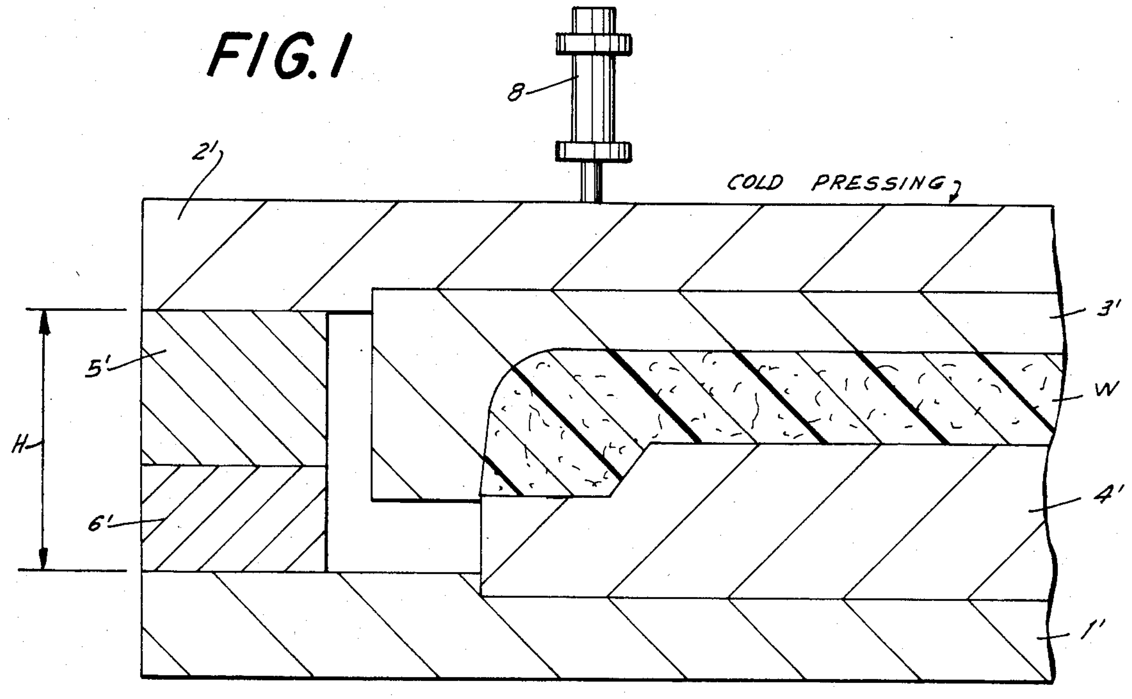
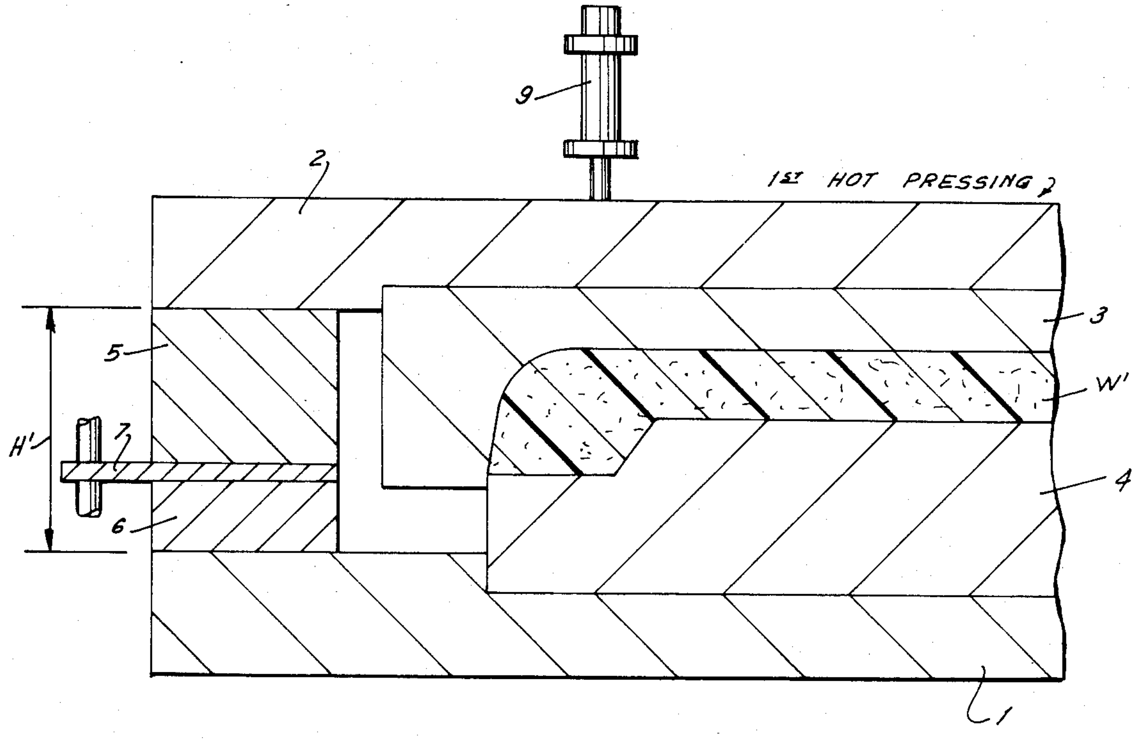
FIG. 2

METHOD OF HOT PRESSING A SYNTHETIC-RESIN LAMINATE

This is a continuation of application Ser. No. 160,144, filed June 6, 1980 which is a continuation of application Ser. No. 007,405 filed Jan. 29, 1979 which in turn is a continuation of application Ser. No. 865,740 filed Dec. 29, 1977 which in turn is a continuation of application Ser. No. 736,089 filed Oct. 27, 1976 and all now abandoned.

BACKGROUND OF THE INVENTION

The present invention relates to a method of making a shaped body. More particularly this invention concerns the production of such a shaped body by cold and hot pressing.

It is known to form a nonswelling mass into a so-called preform body by a so-called cold pressing operation. The mass from which the body is formed normally consists of a fiber filler with which is mixed a thermosetting synthetic-resin binder. In the cold-pressing operation the mass is pressed at a temperature below the setting temperature, that is the temperature at which the resin begins to cure.

It is common practice to then apply to at least a portion of the surface of such a preform body a skin. One or more foils can constitute this skin. In the case of a decorated body it is common practice to apply first a foil bearing the desired pattern or decoration, then to apply over it a transparent protective foil. Thereafter the body and skin are placed in a hot press wherein the assembly is pressed at a temperature well above the setting temperature in order to cure the binder and bond the skin to the preform body.

Such a method is used for production of interior and exterior construction elements, furniture parts, counter tops, and the like. The resin used to bond together the fibers in the preform body which gives the finished shaped body its structural strength are of the nonswelling type, by which is meant that no foaming or increase in volume takes place when the mass is heated. Typically the nonswelling mass consists mainly of lignocellulose-containing fibers such as comminuted and dried woodchips, sugarcane fibers, and the like. They are mixed with a thermosetting synthetic resin such as a melamine-urea-formaldehyde, or phenolformaldehyde resin. It is also possible to use instead of the wood or sugarcane fibers glass fibers, mineral wool, or asbestos fibers alone or mixed together even with the addition of organic binders. The skin is normally formed, as mentioned above, of two foils. The under or decorated foil is a simple paper or a synthetic-resin sheet bearing the desired pattern. The transparent covering sheet or foil is normally a so-called clear overlay consisting of an unsubstituted alphacellulose paper or a glass fiber web which is saturated with a thermosetting synthetic resin normally of a melamine base. It is also simply possible to provide a thick resin coating on the decor or patterned foil.

It is absolutely essential in such shaped bodies that the skin adhere over its entire surface to the preform body to which it is hot-pressed. However, it is common experience that the transparent protective layer is not flowed smoothly over the entire surface to be covered of the preform body. Another common occurrence is that the skin does not adhere at all to the underlying core constituted by the preform body at some locations.

SUMMARY OF THE INVENTION

It is therefore an object of the present invention to provide an improved method of making a shaped body.

Another object is to provide such a method wherein the finished shaped body has a skin which adheres over its entire surface to the core constituted by the underlying preform body.

Yet another object is to provide such a method which produces a shaped body of superior strength and durability.

These objects are attained according to the present invention in a production method of the above-described general type, but wherein the preform body is hot pressed in two stages. In the first stage it is hot pressed into as intermediate body having a volume smaller than the volume of the preform body. The hot press is then opened and a skin is applied to at least a portion of the surface of this intermediate body. Thereafter the skin and the body are hot pressed together into a final integrated body which has a volume still smaller than that of the intermediate body.

Not only does such a dual hot-pressing operation insure that an extremely rigid and compact body is produced, but the application of the foil to the hot-pressed intermediate body ensures that the foil will adhere very well to this body. Furthermore, it has been surprisingly discovered that the main difficulty with adhering such a normally gas-impervious skin to a preform body is that the hot-pressing operation virtually forms puddles of moisture or solvent on the surface of the body. Before the hot pressing the body normally has between 12% and 15% by weight of moisture and after between 5% and 8%. The two-stage hot-pressing system ensures that any of this moisture on the surface will have a chance to run off or evaporate before the skin is applied over it so that good adherence between the skin and the surface of the intermediate body is obtained. Of course, the two hot-pressing steps are carried out in an overall time which is less than the total curing time for the thermosetting synthetic-resin binder.

According to yet another feature of this invention the hot press is provided with a spacer which is left operatively engaged between the two mold halves or press platens during the first pressing operation, but is swung out from this position during the second stage of the hot-pressing operation so that the two mold halves can move closer together and reduce the volume of the body still further.

The novel features which are considered as characteristic for the invention are set forth in particular in the appended claims. The invention itself, however, both as to its construction and its method of operation, together with additional objects and advantages thereof, will be best understood from the following description of a specific embodiment when read in connection with the accompanying drawing.

BRIEF DESCRIPTION OF THE DRAWING

FIGS. 1–4 are vertical sectional views through presses carrying out the method according to this invention and showing the separate steps of the method according to this invention.

SPECIFIC DESCRIPTION OF A PREFERRED EMBODIMENT

Figure 3:
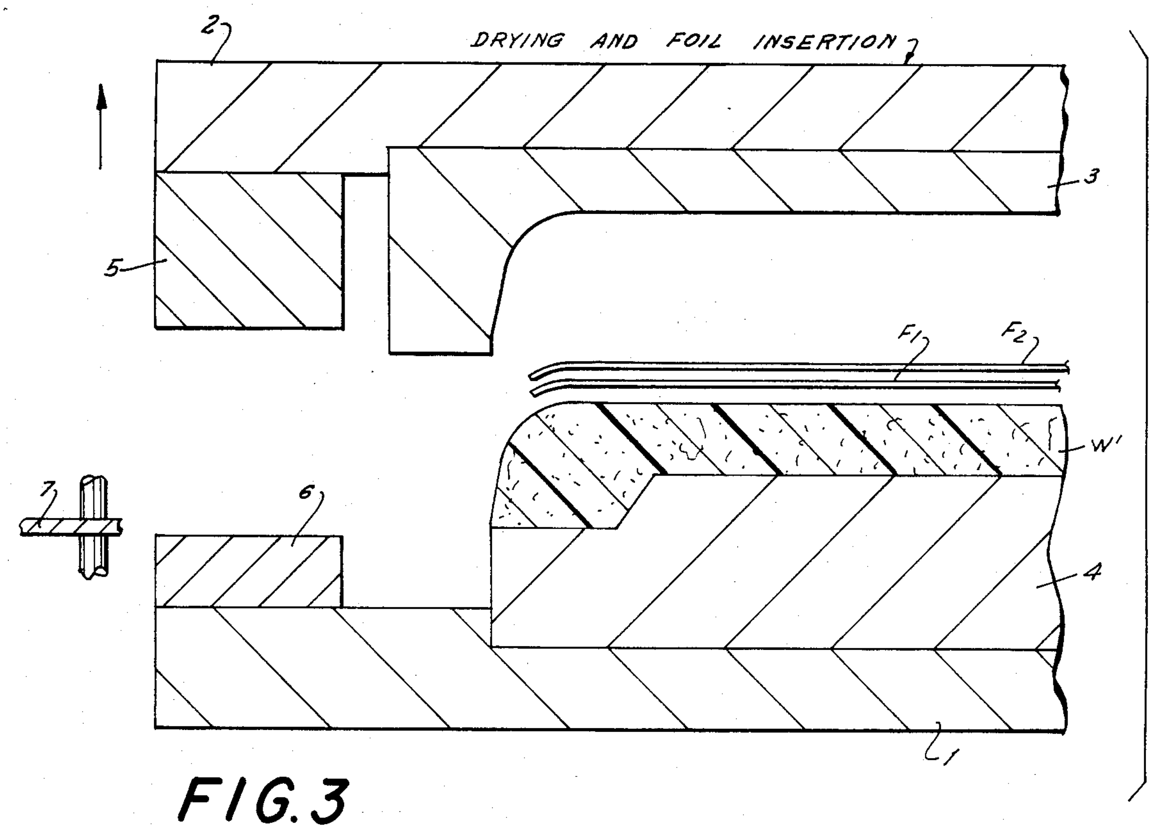

As shown in FIG. 1 a preform body W is formed between a pair of mold halves 3' and 4' respectively carried on press platens 2′ and 1′. The platens 2′ and 1′ are held apart by a distance H by means of respective spacers 5′ and 6′. The platen 1′ is fixed and the platen 2′ is vertically displaceable by means of a hydraulic double-acting cylinder 8.

The body W is formed of a mass of fibrous wood chips constituting a filler and a phenolformaldehyde-resin binder. This mass W has a predetermined volume and the press 1′–6′ is maintained at a temperature well below the temperature of thermal activities of the resin binder.

Thereafter, the body W is transferred to another press having a fixed lower platen 1 carrying a lower mold half 4, movable upper platen 2 carrying an upper mold half 3, and spacers 5 and 6 carried on the platens 2 and 1, respectively. In addition a pivotable spacer 7 is engageable between the spacers 5 and 6 to hold them apart by a distance H′ slightly smaller than the distance H. This press is held closed by a ram 9 and is maintained at a temperature above the thermal activation temperature of the binder in the body. The elements 1–5 are identical to the elements 1′–5′, but the spacer 6 is shorter than the spacer 6′ by a distance equal to somewhat more than the height of the spacer body 7.

In this first hot-pressing stage illustrated in FIG. 2 the volume of the workpiece W is reduced so as to form an intermediate workpiece W′ which is slightly smaller in volume. The temperature of the hot press 1–6 may be maintained by blowing steam through channels formed in the platens 1 and 2.

After the first hot-pressing step the press 1–6 is opened as shown in FIG. 3 and a pattern foil $F_1$ and a transparent cover foil $F_2$ are positioned on top of the workpiece W′. In addition the spacer 7 is pivoted out from between the spacers 5 and 6 carried on the platens 2 and 1.

The foil $F_1$ is a simple paper sheet carrying a design. The foil $F_2$ is formed of a melamine-formaldehyde thermosetting resin.

Figure 4:
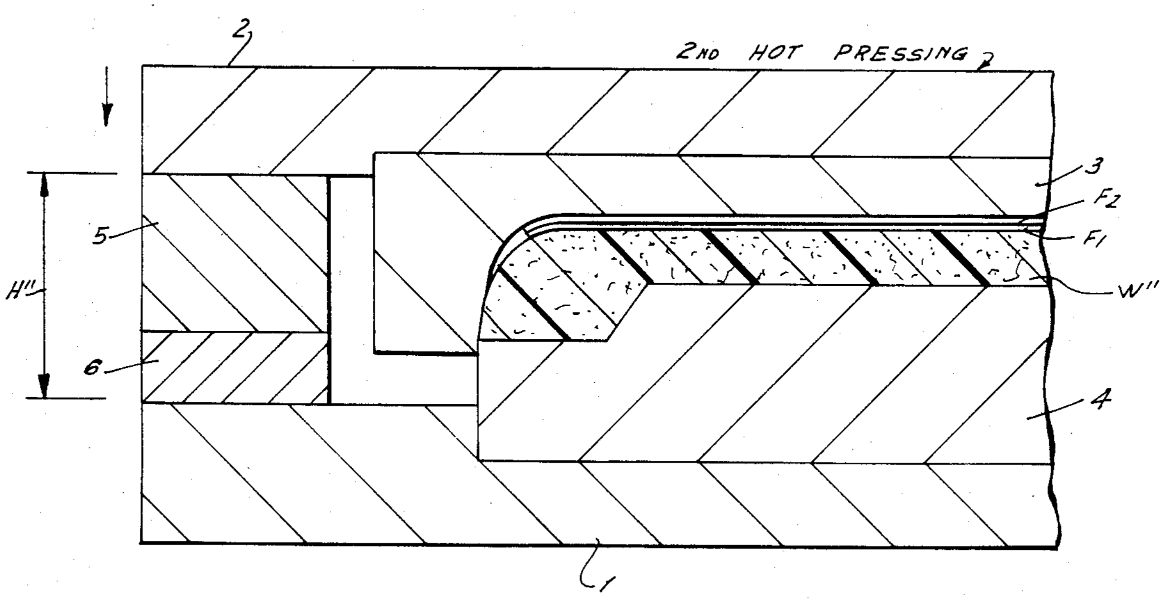

Thereafter as shown in FIG. 4 the press 1–6 is closed, but without the spacer 7 between the spacers 5 and 6 so that the platens 1 and 2 are only spaced apart by a distance H″ which is substantially less than the distance H′. The press is continuously heated above the activation temperature for the various resins in the foils and workpiece, so that a workpiece W″ is formed which is of somewhat smaller volume than the workpiece W′. In this manner the foils $F_1$ and $F_3$ are perfectly integrated with the workpiece. In addition it is noted that during the step shown in FIG. 3 any solvent puddles that formed on the surface of the intermediate body W′ are able to evaporate or run off so that the foils $F_1$ and $F_2$ will be sure to adhere over the entire surface of the body.

It is possible in this method to produce a finished shaped body of extremely high density and good strength. At the same time the cover foils will be perfectly integrated with the bodies so that the resulting laminate will be virtually inseparable.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of making a shaped body with a skin, comprising the following steps in the order named: cold pressing a mass of fibers and a thermosetting binder between a pair of mold halves to form a preform body of a predetermined volume; placing said preform body between a pair of hot mold halves; introducing a spacer between said hot mold halves to define a predetermined distance between said hot mold halves; hot pressing said preform body between said hot mold halves at a temperature above the thermal activation temperature of the binder to convert said preform body into an intermediate body having a secondary volume and a thickness which is smaller than that of said preform body and defined in accordance with said predetermined distance, the thickness of said intermediate body being greater than that of a final integrated body; opening said hot mold halves so as to at least partly dry and degas the intermediate body; removing said spacer from said hot mold halves; placing a skin onto at least a portion of one of the end faces of said intermediate body; and hot pressing said skin and thus degassed intermediate body together to form the final integrated body.

2. The method as defined in claim 1, wherein said step of placing a skin on at least a portion of said end face of said intermediate body comprises the steps of placing a decorative sheet onto said end face and placing a sheet of thermosetting resin over said decorative sheet.

3. The method defined in claim 1, wherein said skin is of synthetic-resin material and is applied to said intermediate body as a foil.

4. The method defined in claim 1, wherein said skin is a pair of sheets, at least one of which is at least partially composed of a thermosetting synthetic resin.

* * * * *